United States Patent [19]

McElroy et al.

[11] Patent Number: 5,084,256
[45] Date of Patent: Jan. 28, 1992

[54] METHOD FOR REDUCTION OF SULFUR PRODUCTS FOR GASES BY INJECTION OF POWDERED ALKALI SORBENT AT INTERMEDIATE TEMPERATURES

[75] Inventors: Michael W. McElroy, Los Altos, Calif.; Roderick Beittel, Birmingham, Ala.; Steven J. Bortz, Laguna Niguel; George R. Offen, Woodside, both of Calif.

[73] Assignee: Electric Power Research Institute, Inc., Palo Alto, Calif.

[21] Appl. No.: 565,869

[22] Filed: Aug. 9, 1990

Related U.S. Application Data

[63] Continuation of Ser. No. 868,424, May 29, 1986, abandoned.

[51] Int. Cl.⁵ .......................... B01J 8/00; C01B 17/00
[52] U.S. Cl. ........................................................ 423/244
[58] Field of Search ............................................... 423/244

[56] References Cited

U.S. PATENT DOCUMENTS

| | | | |
|---|---|---|---|
| 3,969,482 | 7/1976 | Teller | 423/244 |
| 4,115,518 | 9/1978 | Delmon et al. | 423/244 A |
| 4,178,349 | 12/1979 | Wienert | 423/244 A |
| 4,324,770 | 4/1982 | Bakke | 423/244 A |
| 4,388,283 | 6/1983 | Abrams et al. | 423/244 A |
| 4,519,995 | 5/1985 | Schrofelbauer et al. | 423/244 A |
| 4,600,568 | 7/1986 | Yoon et al. | 423/244 A |

FOREIGN PATENT DOCUMENTS

903598 3/1986 Belgium .
2174082 10/1986 United Kingdom .

Primary Examiner—John Niebling
Assistant Examiner—Brian M. Bolam
Attorney, Agent, or Firm—Laurence Coit

[57] ABSTRACT

A method is provided for reducing the sulfur content of exhaust (flue) gas from a combustion installation manufacturing process, or chemical process comprising the step of injecting dry powder alkali hydrate sorbent directly into intermediate temperature (800°–1200° F.) combustion/process gases. The alkali hydrate sorbent reacts rapidly with the sulfur-containing gases in this temperature regime to produce primarily alkali sulfites. The unreacted portion of the sorbent largely remains in the form of an alkali hydrate and may react further with residual sulfur, especially in the presence of water, at lower temperatures. A novel combustion chamber is also provided having an injection means for injecting alkali hydrate sorbent into a combustion volume where the temperature is in the range of 800°–1200° F., to cause a predetermined reaction of the alkali hydrate sorbent with $SO_2$ and the combustion gases to produce primarily alkali sulfites with the unreacted sorbent remaining substantially as alkali hydroxide.

11 Claims, 7 Drawing Sheets

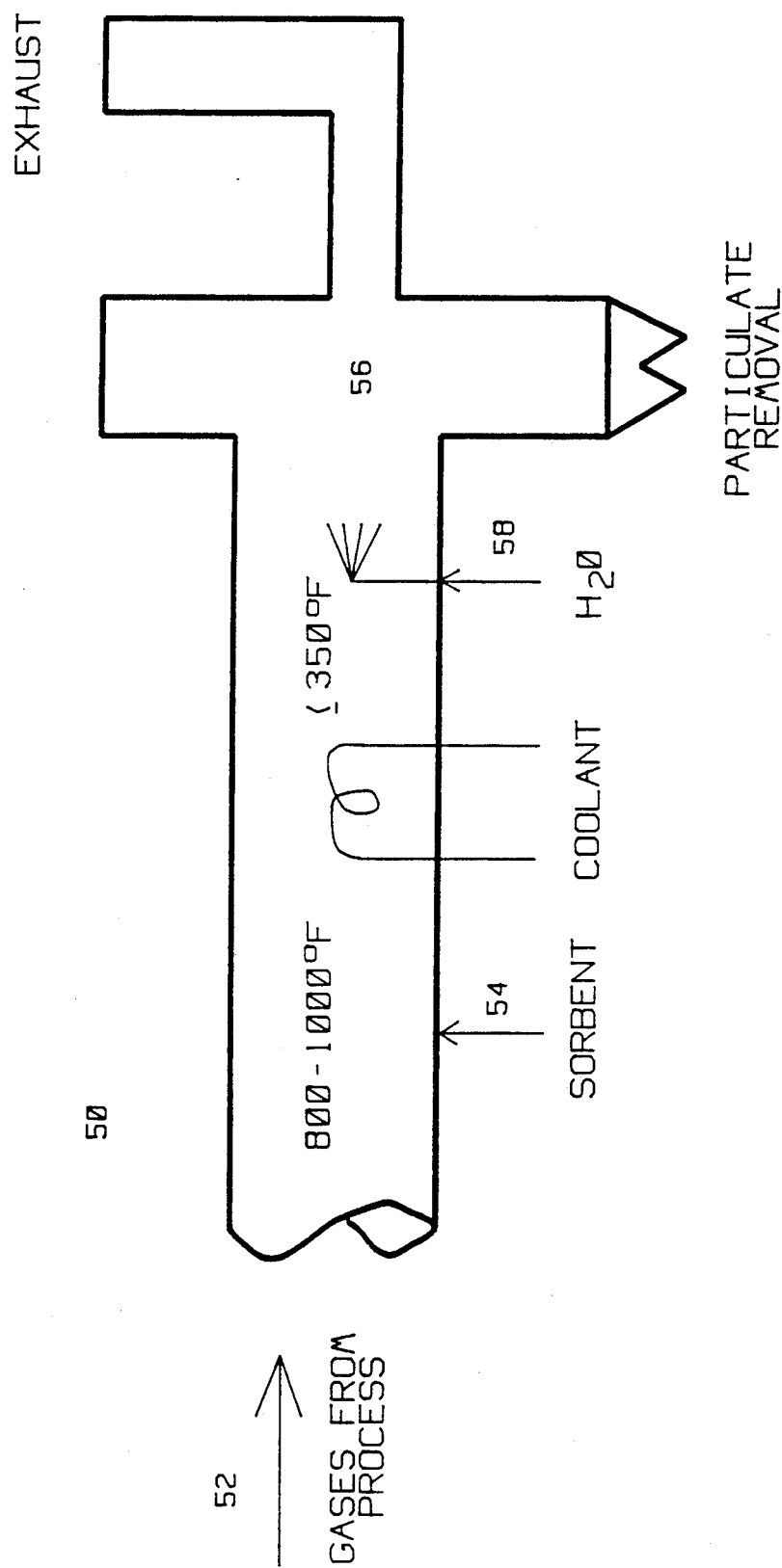

METHOD FOR REDUCTION OF SULFUR PRODUCTS FOR GASES BY INJECTION OF POWDERED ALKALI SORBENT AT INTERMEDIATE TEMPERATURES

This invention was made with the support of the Electric Power Research Institute and is a continuation of application Ser. No. 06/868,424 filed May 29, 1986, now abandoned.

BACKGROUND OF THE INVENTION

1. Field of the Invention

The present invention is directed to a process for reducing the gaseous sulfur-containing products in the gases resulting from combustion of fossil fuels containing sulfur compounds, as well as from other manufacturing/chemical processes. In particular, the present invention is directed to reducing the gaseous sulfur-containing products in the gases by injecting dry powdered alkali hydrates into the gases at a location where their temperature is approximately 800° to 1200° F.

2. Description of the Prior Art

The use of sulfur-bearing fuels in combustion installations (furnaces, burners, boilers, internal combustion reciprocating engines and turbines, and the like) results in the production of sulfur-containing compounds, in particular sulfur dioxide and lesser amounts of sulfur trioxide. Air pollution regulations in many political jurisdictions throughout the world require that these sulfurous constituents be removed from the exhaust gases prior to release into the atmosphere. Various chemical additives are known, including calcium carbonate (limestone), magnesium carbonate (dolomite), and the hydrates of each of these, which react with sulfur dioxide (and sulfur trioxide) in a manner which causes the sulfur compound to be sorbed on these particulate chemicals. It is also known that reactions producing these results can take place at temperatures between approximately 2300° and 1600° F. as well as at temperatures below approximately 350° F. The specific reactions, however, are different in these two temperature regimes, and the reactions in the lower temperature regime (below 350° F.) are greatly enhanced by (1) the presence of water, and/or (2) cooling of the sulfur-containing gases to temperatures approaching their saturation point. The particles formed by the reactions in either temperature regime may be removed from the exhaust gases, with any particles formed during or remaining after combustion, by various means, such as filtration of the flue gases or electrostatic precipitation, and then discarded or recycled.

The efficiency of such a sulfur scrubbing process depends on numerous factors, especially the sorbent used and the temperature environment at, and immediately downstream of, the injection location. The amount of sulfur removed when injected into the higher temperature regime cited above is limited by (1) the rate competition between calcination/sulfation and sintering (disappearance of available reaction surface), and (2) the residence time of the combustion flue gases in the critical temperature window for sulfation (2300° to 1600° F.). In many applications the residence time is too short to achieve more than 15 to 20 percent utilization of the sorbent. Such low utilizations make the economics marginally acceptable for many potential applications.

In addition, rapid, thorough mixing of the injected sorbent with the combustion flue gases is difficult to achieve, especially in large boilers. The most practical and reliable way of introducing the sorbent (particularly at elevated temperatures) is by injecting it through ports in the wall of the combustion volume (see U.S. Pat. No. 3,481,289); with this technique it is difficult to cause the sorbent to penetrate throughout the volume of a big boiler, and large quantities of transport air are required, decreasing the efficiency of the boiler. Attempts to overcome this mixing problem (see U.S. Pat. No. 3,746,498 on premixing the sorbent with the coal prior to introducing them together through the burner; U.S Pat. No. 4,331,638 on injecting the sorbent with the secondary air around the burner; and U.S. Pat. No. 4,440,100 on introducing the sorbent below [the burner] zone) result in deactivation of a substantial portion of the sorbent due to sintering caused by exposure to the high temperatures of the flame and furnace. A process that introduces the sorbent above the burner zone as an aqueous solution or slurry (see U.S. Pat. No. 4,555,996) may overcome the mixing and deactivation (sintering) problem, but increases the complexity of the system, by adding the equipment to prepare and transport the aqueous solution or slurry, and reduces the thermal efficiency of the boiler.

Effective capture of the sulfur compounds when injecting at or below 350° F. requires the development of a system for cooling and/or humidifying the gases without causing wet lime particles or other solid combustion byproducts (e.g., fly ash) to adhere to structures inside the duct or downstream particulate control device. This scheme may also require enlarged ducting to increase the residence time for vaporizing the water droplets (if water injection is used) and, possibly, replacement of the electrostatic precipitator (the most common particulate control system on boilers with no sulfur scrubber) with a baghouse filtration system to provide sufficient time for the reaction. Utilization efficiency of conventional calcitic hydrate sorbents is similar to that achieved by injecting into the higher temperature zone. Hence, the economics of this low temperature process may also be only marginally acceptable for many potential applications.

Therefore, there remains in the art the problem of finding a combination of sorbent, injection location, and injection methodology that (1) provides the correct temperature and residence time to favor a reaction which results in a higher utilization than that obtainable with the high and low temperature processes described above, (2) does not require a high level of humidification, and (3) facilitates the injection/mixing problem in large units.

Various methods have been proposed to attempt to deal with this problem. According to one proposed method, the sorbent is precalcined outside the boiler at conditions which are tailored to produce high specific surface areas and then injected into the combustion flue gases. Utilization was found to increase in proportion to the surface area produced during calcination when commercial sorbents were injected into the higher temperature region (2300° to 1600° F.) of pilot-scale combustors. However, this approach failed to improve sorbent utilization significantly (i.e., by more than 2 to 4 percentage points in most cases) when very high area precalcined sorbents were injected into the higher temperature region. The negative effect of sintering, which depends approximately on the square of the surface area, is greater than the benefit of higher surface area. The technique is being investigated further for use in the lower temperature injection process, but requires that a water humidification system needed for that process be developed.

While the surface area of sorbents might be increased prior to injection by multiple hydration/dehydration steps and/or by hydrating in an ice bath in the presence of alcohol, the resulting sorbents would suffer from the same problem of sintering cited above for high temperature injection and, in any case, this approach may not be effective at lower temperatures.

According to a third known method, an additive such as an alkali metal compound (e.g., sodium), transition element (especially chromium), or iron compound is added to the alkali earth metal sorbent (calcium and/or magnesium carbonate or hydrate), and the mixture injected into the sulfur-containing combustion flue gases. The additive (e.g., an alkali metal) can be physically admixed in a dry state with the sorbent (calcium and/or magnesium compound) or, if the sorbent is a hydrate, incorporated into the hydrate by adding a water soluble compound of the additive to the water of hydration. However, the benefit of this approach, at least on a pilot combustor scale, ranges from none to at most four percentage points increase in sorbent utilization. In addition, many of these additives are expensive, may harm the boiler, and/or may be toxic when discharged into the environment.

It is, therefore, an object of the present invention to provide sorbents and means and methods of sorbent injection that improve the efficiency (speed of reaction and completeness of reaction) of the binding reaction with sulfur-containing gases.

SUMMARY OF THE INVENTION

Briefly, a method is provided for reducing the sulfur content of gas from a combustion installation comprising the step of injecting dry powder alkali hydrate sorbents directly into sulfur-containing gases such as, but not limited to, combustion gases, at temperatures in the range of about 800° to 1200° F. The alkali hydrate sorbent reacts rapidly with sulfur-containing gases in this intermediate temperature regime to produce alkali sulfites (and some carbonates, too). The unreacted portion of the sorbent will be largely in the form of an alkali hydrate and will react further with residual sulfur if the gases are cooled and/or humidified to within approximately 50° F. of their saturation temperature. The present invention further provides a novel combustion chamber having an injection means for injecting alkali hydrate sorbents into a combustion volume where the temperature is in the range of about 800°-1200° F.

BRIEF DESCRIPTION OF THE DRAWINGS

The invention may be better understood and further advantages and uses thereof more readily apparent when considered in view of the following detailed description of exemplary embodiments, taken in conjunction with the accompanying drawings, in which:

FIG. 3 also presents the actual temperature-time history of the gases in the pilot-scale combustor used to demonstrate the present invention.

FIG. 6 is a schematic view of any controlled volume of gases which contains sulfur dioxide, where it is desirable to reduce or eliminate the sulfur dioxide according to the teachings of the invention.

DESCRIPTION OF THE PREFERRED EMBODIMENTS

The present invention provides a process for reducing the sulfur content of gas from a combustion installation by injecting a calcitic, magnesium, or dolomitic hydrate (the "sorbent") in either dry powder form or an aqueous solution into the sulfur-containing gas stream such that the hydrate particles become exposed to the gas at a temperature between 800° and 1200° F., whereupon they are capable of reacting with sulfur compounds. The primary reactions of interest are between the hydrate and $SO_2$ to form, in the case of calcium hydrate, calcium sulfite ($CaSO_3$) and lesser amounts of calcium sulfate ($CaSO_4$). While not intending to be bound by a particular theory, it is believed that the improved sulfur capture obtained by injecting hydrates into this temperature regime is due, in part, to (1) the very fast reaction rate of $Ca(OH)_2$ and $SO_2$ at these temperatures, and (2) the formation of a sulfite rather than a sulfate, which is formed in the reaction at the higher temperature regime (1,600° to 2,300° F.). Sulfite occupies less of the pore volume liberated by the separation of the water molecule from the hydrate (or the carbon dioxide molecule from a limestone used at the higher temperatures) then does sulfate, thereby allowing more reaction product to accumulate in the pores of the sorbent before they become blocked and impede further reactions between the sorbent and the sulfur in the gas.

Figure 1:
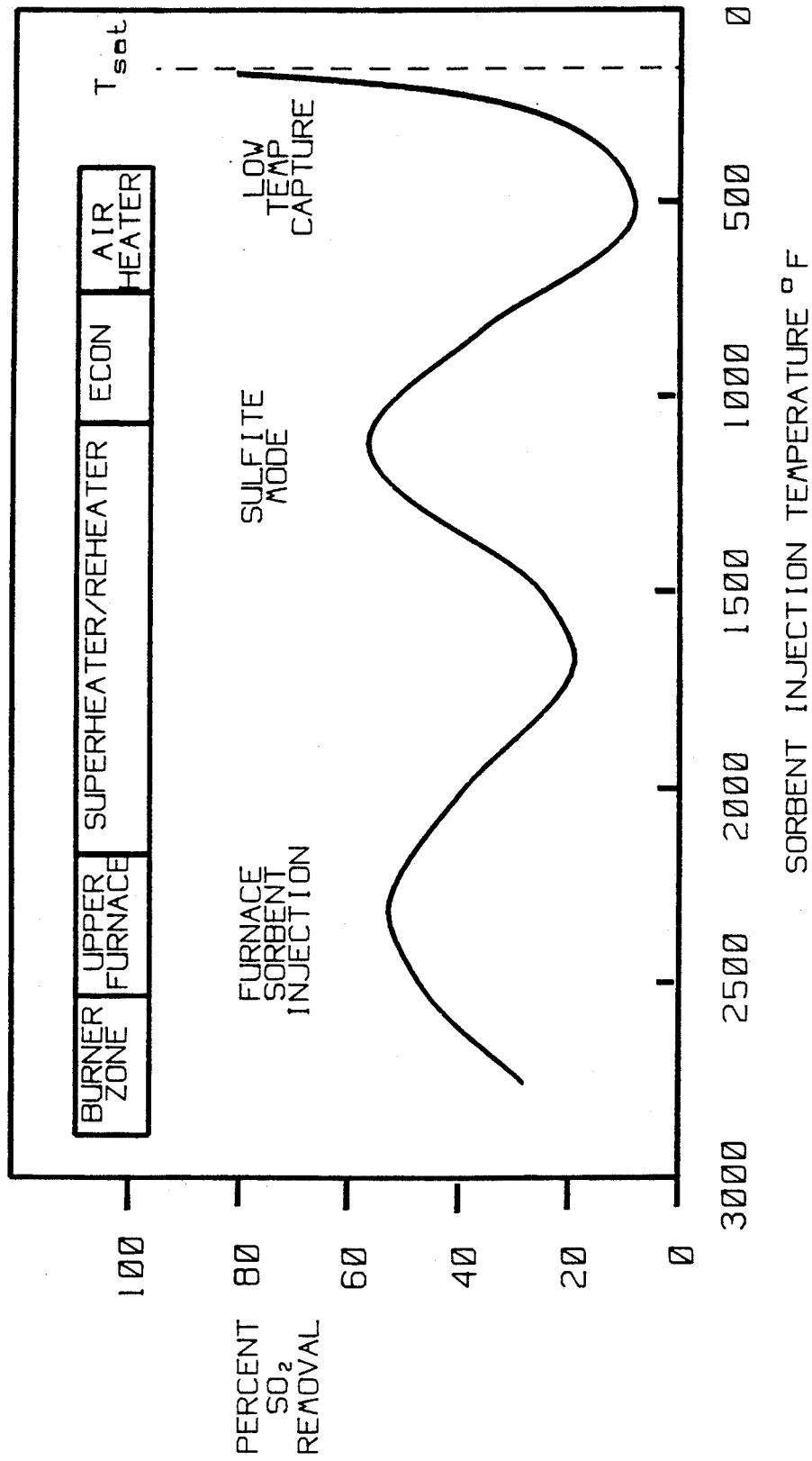
FIG. 1 is a graph of the percent $SO_2$ removal from combustion gases by a preferred sorbent (a pressure hydrated dolomite) when injected into a pilot-scale boiler simulator. The $SO_2$ removal rates are presented as a function of temperature, ranging from the highest experienced in the system (the temperature of sorbent injected with the fuel) to the saturation temperature of water. Of particular note is the peak in reactivity around 1,000° F., which phenomenon was discovered by the applicants and is exploited according to the teachings of the invention.

Within the range of approximately 800° to 1,200° F., the optimum injection temperature (i.e., temperature of the combustion gases into which the sorbent is injected) and orientation of the injectors (e.g., coflowing, counter-flowing, or crossflowing to the combustion gases) will depend upon the sorbent, temperature-time history of the gases downstream of the injection location, space constraints, if any, near the desired injection location, and, possibly, constituents of the gases. For example, when a preferred sorbent, hydrated dolomitic lime, was injected into a pilot combustor that simulates the thermal history of a utility boiler, the optimum injection temperature in the intermediate temperature regime was approximately 1,000° F. as shown in FIG. 1. For a given application this optimum location and orientation can be determined by experimentation in a pilot-scale combustor designed to reproduce the temperature-time history of the gases in that particular application (see, for example, the installation depicted in FIG. 2, in which the temperature-time histories depicted in FIG. 3 for a typical 600MW coal-fired boiler are reproduced). Alternatively, the results shown in FIGS. 4A or 4B can be used in conjunction with knowledge of the specific temperature gradient and flows in the 800° to 1,200° F. regime for the particular application to select the injection location and orientation.

Figure 4A:
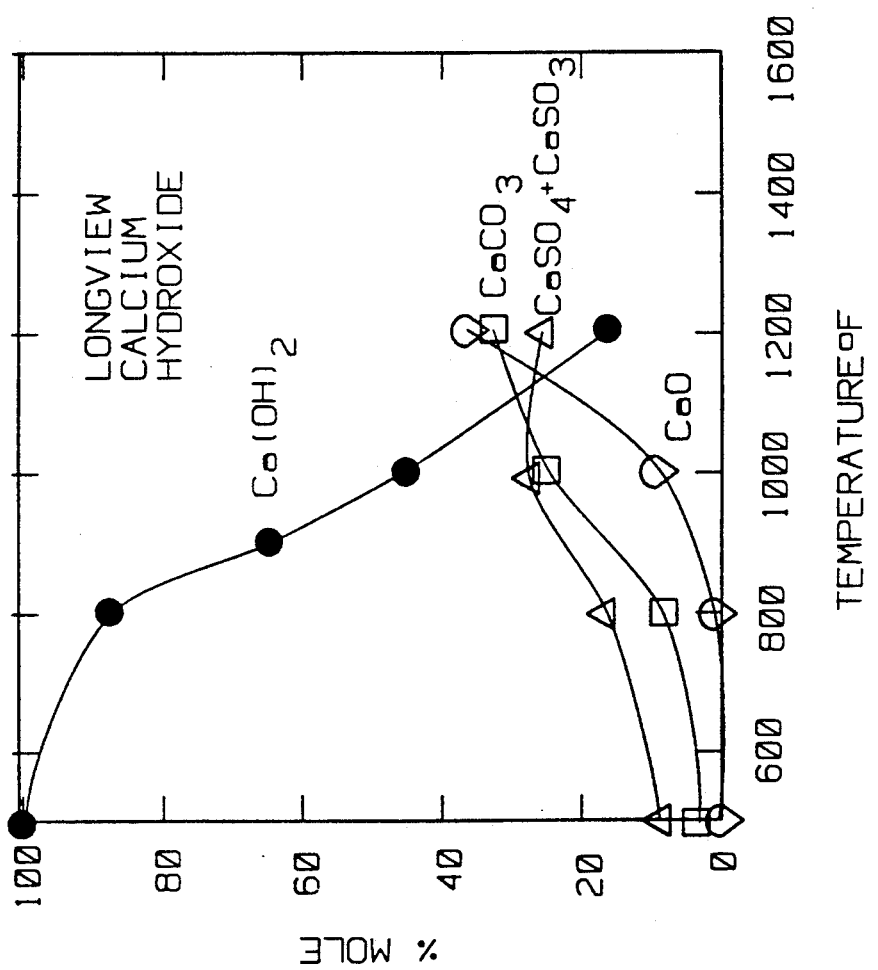
FIG. 4A illustrates the results of tests conducted in a bench-scale, constant temperature laboratory combustor, showing the decomposition of a commercial calcium hydroxide into calcium oxide and the results of the reactions between the remaining calcium hydroxide and the carbon dioxide and sulfur dioxide in the combustion flue gases, all as a function of reactor temperature.
Figure 4B:
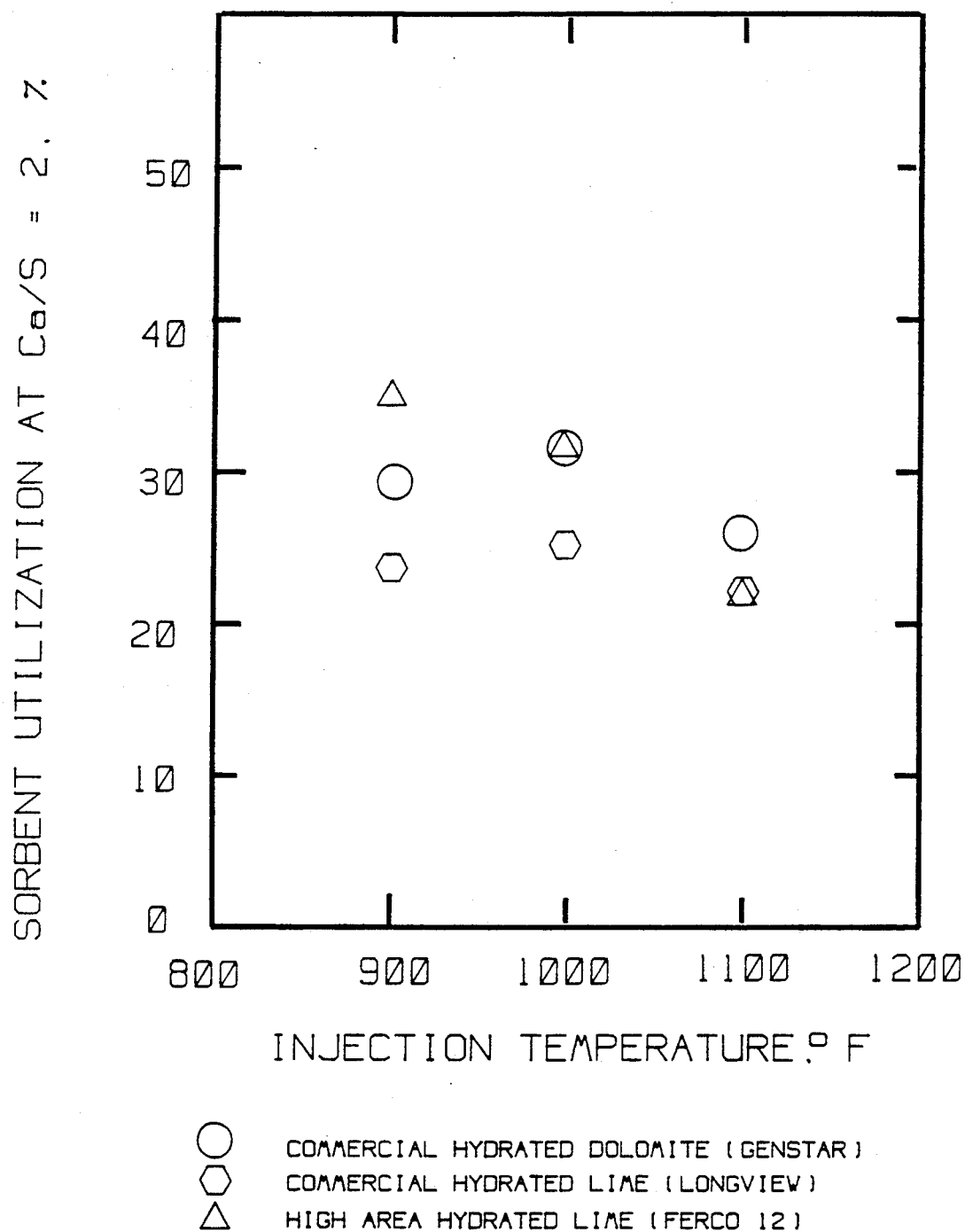
FIG. 4B illustrates the results of tests conducted in a pilot-scale boiler simulator (with the temperature-time profile depicted in FIG. 3) showing the amount of sulfur dioxide removed from the combustion flue gases by different sorbent materials injected at various temperatures.

Thus, FIG. 4B shows that the optimum injection approach for a combustion installation with a 900° F/s temperature decline rate following the injection location (the temperature decline rate shown in FIG. 1 for the pilot combustor of FIG. 2) and no physical obstacles at the injection location would be horizontally opposed injectors (as used in the installation depicted in FIG. 2) located at approximately 1,000° F. for the GENSTAR or LONGVIEW sorbents and approximately 900° F. for the FERCo 12 sorbent.

As shown in FIG. 4A, at lower temperatures the reaction between the hydrate and $SO_2$ in the gas is slower, whereas at higher temperatures the chemistry favors the dehydration of the calcium hydroxide into quicklime (CaO), and the reaction of the hydrate with carbon dioxide ($CO_2$) in the gas to form $CaCO_3$, neither of which products are significantly reactive with $SO_2$ at these temperatures. Typically, 25 to 40 percent of the calcitic content of the sorbent is sulfated, or "utilized," when using commercially available hydrates. However, the utilization can be increased by injecting sorbents with very high surface area and/or porosity. Thus, the FERCo 12 sorbent in FIG. 4B was specially produced to yield a specific surface area of 38 $m^2/g$, whereas the commercial LONGVIEW calcitic hydrate used had a specific surface area of 18 $m^2/g$.

To achieve maximum utilization of the sorbent, it must be introduced in such a fashion that it rapidly becomes uniformly mixed with the combustion gases. Because the temperature window for sorbent injection according to the present invention is within the range where ordinary steel can survive for long periods, in one modification, one may introduce the sorbent from tubes that penetrate into the duct containing the flow of gases, if needed to obtain a uniform mixture of the sorbent with the combustion gases.

In one preferred embodiment, the sorbent may be injected as an aqueous solution or particulate suspension to increase the momentum of the injected sorbent for increased penetration into the duct containing the flue gas, to improve mixing of the sorbent with the flue gas, or to allow sorbent injection at temperatures above the optimum, if required by the physical constraints of the application. In addition, slaking of a quicklime (i.e., hydration in an excess of water), which could be used to produce an aqueous solution of the hydrated sorbent, may also produce a higher surface area, and hence more reactive, sorbent than commercial hydration processes. Although this embodiment (injection as an aqueous solution or particulate suspension), which may apply the process described in U.S. Pat. No. 4,555,996 (for injection above 2,200° F.) to these lower temperatures, may facilitate the engineering design of the present invention for certain applications and/or may improve its effectiveness, the present invention does not depend materially on the use of an aqueous solution to introduce the sorbent.

At the optimum injection temperature for calcium hydroxide i.e., 800°-1,200° F. as discussed above, the majority of the unsulfated and uncarbonated sorbent remains as calcium hydroxide (see FIG. 4A showing substantial $Ca(OH)_2$ remaining and very low levels of CaO below 1,000° F). Injection of hydrate into this temperature regime differs from injection of hydrates or carbonates into the higher temperature regime in that the unreacted material is in the form of a hydrate instead of an oxide (i.e., CaO or CaO.MgO). This provides an opportunity for additional reduction of the sulfur in the gas further downstream. As is known to those skilled in the art, commercial spray dryer technology and other experiences demonstrate that calcium hydroxide reacts readily with $SO_2$ in flue gas if the gas is cooled and humidified to within 30° to 50° F. of the water saturation point (typically 135° F. in the absence of $SO_3$). This humidity condition can be made to occur in the ductwork upstream of the particulate collection device, where flue gas temperatures are below 350° F., by introducing fine water droplets through spray nozzles inserted into the duct.

As with other sorbent injection processes, the product of these reactions is a dry particulate that can be captured by the combustion system's particulate collection device.

Referring again now to the drawings, and to FIG. 5 in particular, there is shown a combustion chamber 10 including housing 12 defining a combustion volume 14 which includes a burner zone 16 and an exhaust zone 18. The combustion chamber 10 is adapted to burn fossil fuels so as to provide temperatures of approximately 2800° F. at the burner zone 16 decreasing to 150° F at the exhaust zone 18. Combustion chamber 10 further includes economizer 20 and injection means 22 for injecting alkali hydrate sorbent into combustion volume 14 at a location between burner zone 16 and exhaust zone 18 where the temperature is in the range of 800°-1200° F. Economizer 20 is preferably located at an area where the temperature is about 1,000° F. during operation of the chamber. Injection of alkali hydrate sorbent into the combustion gases at this location provides for a predetermined chemical reaction of the alkali hydrate sorbent and $SO_2$ such that a majority of the sulfated sorbent is alkali sulfite and a majority of the unreacted sorbent remains as alkali hydroxide. Water or steam injection through spray nozzles 24 may be used to obtain further reaction of the sorbent with the residual $SO_2$.

Figure 2:
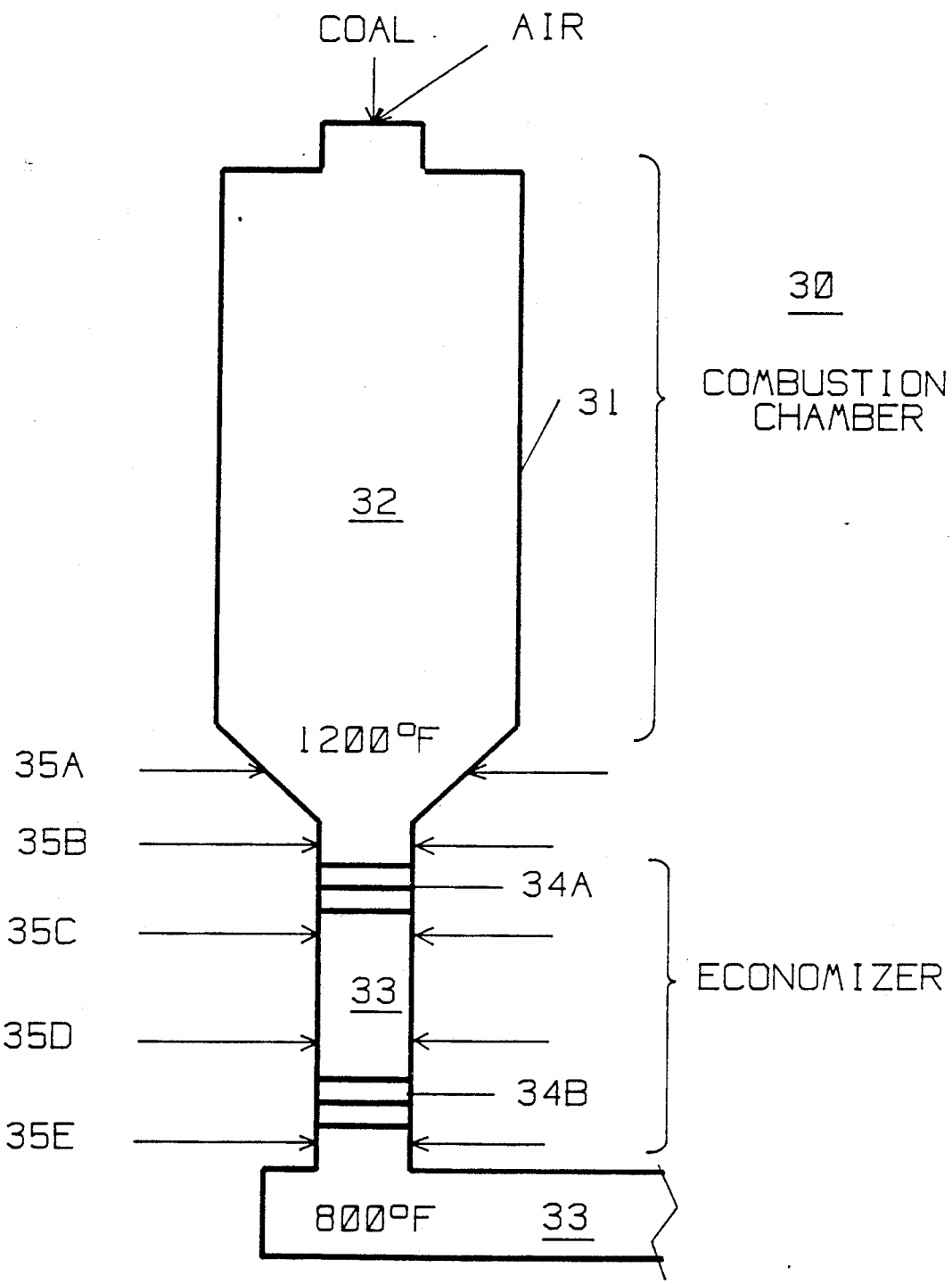
FIG. 2 is an illustration of a combustion installation embodying the present invention.

Referring to FIG. 2 there is shown another embodiment of a combustion chamber constructed according to the present invention. Combustion chamber 30 is defined by a housing 31 which defines a combustion volume 32 which is also the burner zone and an exhaust zone 33. The combustion chamber 32 is adapted to burn coal and provides temperatures of approximately 2,800° F. decreasing to 150° F. or less in the exhaust zone 33.

The exhaust zone 33 also includes convective banks 34A and 34B, which may be, for example, first and second portions of an economizer used to cool the combustion gases to provide a desired temperatures. The alkali hydrate sorbent may be injected into combustion volume 32 by means of injection ports 35A through E to provide for sorbent injection where the temperature range is approximately 800°-1200° F. As the combustion gases exit the combustion zone 32, the gases gradually become cooler. In the area near ports 35, given the design of this combustion chamber, the gases are approximately at 1,200° F. Likewise near port 35E, the gases are approximately at 800° F. In general maximum sorbent utilization is experienced at injection port 35C, where the gases are approximately 1000° F. Specific variations and consistencies of sorbent, however, can be expected to result in maximum utilization at one or more of the injection ports 35A through 35E within the temperature range of 800°-1200° F.

The following examples are provided for purposes of illustration, but are not intended to limit the invention by any means or in any manner.

EXAMPLE 1

Figure 5:
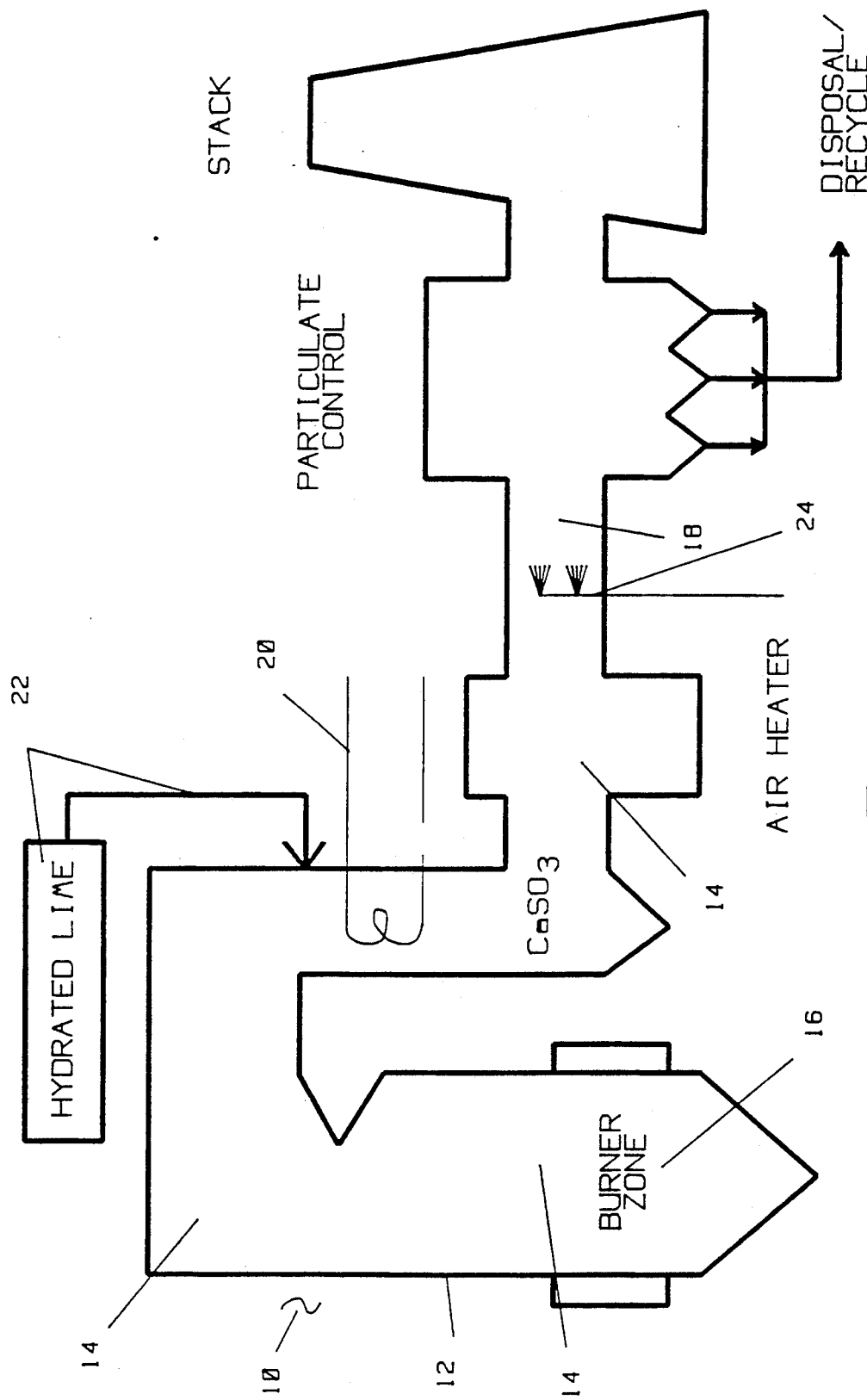
FIG. 5 is a schematic view of an embodiment of a combustion chamber according to the teachings of the invention applicable for use in an electrical utility.

A pressure-hydrated dolomite is injected into a pilot-scale combustor that simulates the configuration shown in FIG. 5. The percent $SO_2$ removal from the combustion gases (coal) is plotted in FIG. 1 versus the sorbent injection temperature. The sorbent is injected at various locations throughout the combustor and superheater economizer and air heater. As the combustion gases flow from the burner zone to the air heater the temperature of the gases gradually decreases. It will be noted, however, that the reactivity of the injected sorbent at various temperatures is not constant and of particular note is a peak of sorbent activity around 1,000° F., which phenomenon was discovered by the applicants and is exploited according to the teachings of the invention.

EXAMPLE 2

Figure 3:
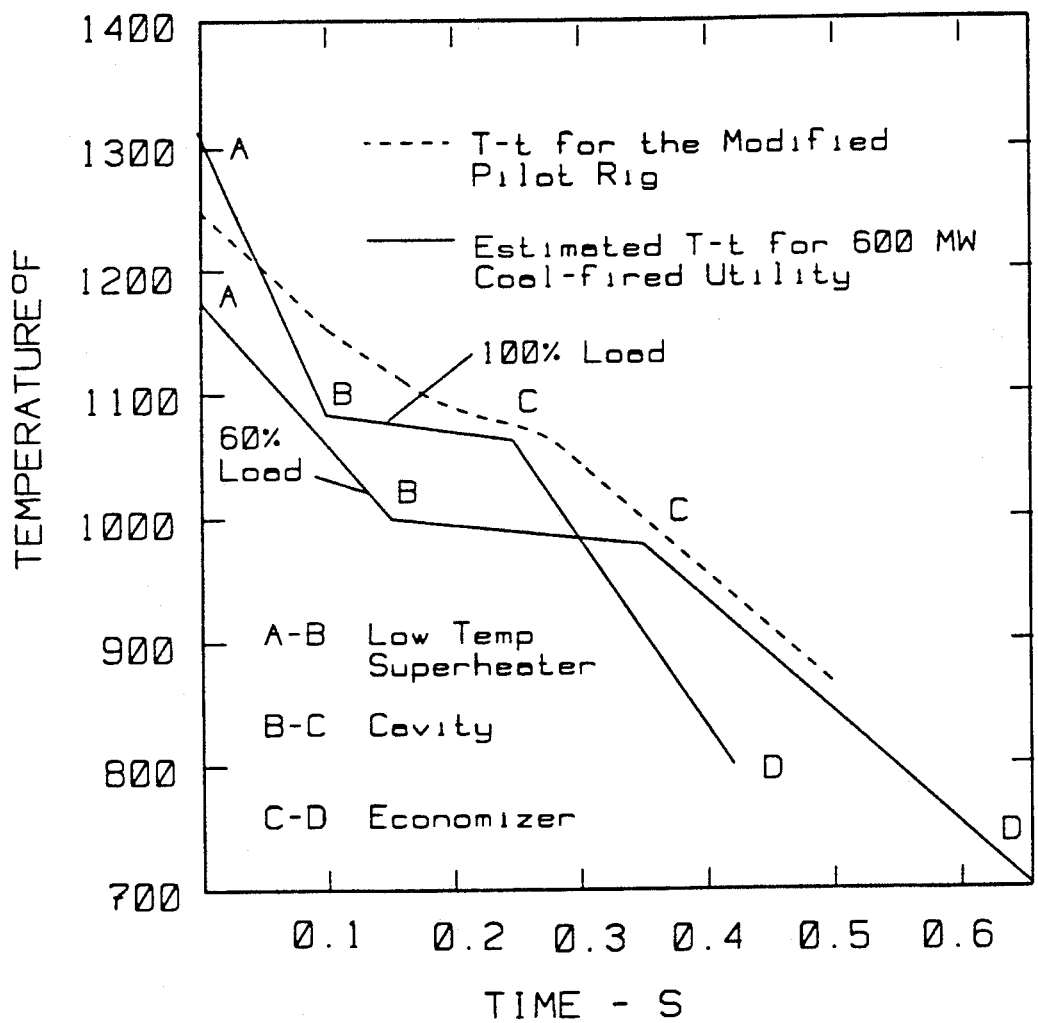
FIG. 3 is a graph of the temperature-time history of combustion flue gases in a typical large (600 MW) coal-fired boiler in the region surrounding the middle peak of the reactivity curve of FIG. 1. On such a coal-fired utility boiler operating at a full load, this peak of reactivity occurs near the gas-side entry into the economizer tube banks.

The temperature-time history of combustion flue gases in a typical 600 MW coal-fired boiler in the region surrounding the middle peak of reactivity of the curve of FIG. 1 is tested by putting the boiler under three sets of coditions. The temperature-time histories under these three sets of conditions are shown in FIG. 3. The solid lines indicate the temperature-time histories of the combustion gases of the 600 MW coal-fired combustor under 100% load and 60% load, respectively. The dash curve shows the temperature time history of the combustion gases in the modified pilot-scale boiler simulator shown in FIG. 2. Three different sorbents were injected at a zone in this pilot-scale combustor where the gases are approximately 1,000° F. The graph in FIG. 4B shows the amount of sulfur dioxide removed from the combustion flue gases of each of the different sorbent materials injected at three different temperatures as indicated.

Although these examples and the invention are described above in terms of a combustion chamber, the invention is not to be considered so limited, but rather is broadly applicable to any controlled gaseous volume containing sulfur dioxide, wherein it is desirable to reduce or eliminate the sulfur dioxide from the controlled volume.

Referring now to FIG. 6 there is shown a schematic view of gas chamber 50 enveloping a predetermined controlled gaseous volume 52 which gaseous volume contains sulfur dioxide. Gas chamber 50 includes injection port 54 for introducing alkali sorbent to gaseous volume 52 and particulate removal device 56 for removing alkali sulfite and unsulfated sorbent from gaseous volume 52. In operation gaseous volume 52 would be brought to the favorable temperature range 800° $\propto$ 1200° F. as taught by the invention, and the alkali sorbent would be injected through injection port 54. Subsequently, the temperature of gaseous volume 52 would be reduced to the 100°-350° F. range by cooling and/or humidification (using water spray nozzles 58) to provide for further reduction of the $SO_2$ by the reaction of the alkali hydroxide and $SO_2$ as explained supra. The formed alkali sulfite would then be removed by removal device 56 along with the unsulfated sorbent and any other particulate present in gaseous volume 52.

What is claimed is:

1. A method for reducing the sulfur content of a combustion gas from a combustion installation comprising the step of injecting a dry powdered sorbent selected from the group consisting of calcium hydrate, magnesium hydrate, dolomite hydrate and mixtures thereof, into sulfur-containing gases at a location in said combustion installation where combustion gases are between 800 and 1200 degrees F., without said injection significantly decreasing the temperature of said gases, said injection of dry powdered sorbent providing during the residence time of said gases within said combustion installation a chemical reaction of said sorbent with $SO_2$ and the combustion gases that converts at least 25 percent of said sorbent to sulfite, with the remaining unreacted sorbent being substantially alkali hydroxide.

2. The process according to claim 1 wherein said sorbent has a surface area greater than 20 square meters per grams.

3. The process according to claim 1 wherein said sorbent has a porosity greater than 0.3 cubic centimeters per gram for all the pores with a diameter less than 0.25 microns.

4. The process according to claim 1 wherein 90 percent by weight of said sorbent has a diameter smaller than 3 microns.

5. A process according to claim 1 wherein said sorbent is injected coflowing with said combustion gas.

6. A process according to claim 1 wherein said sorbent is injected counterflowing with said combustion gas.

7. A process according to claim 1 wherein said sorbent is injected cross-flowing with said combustion gas.

8. A process according to claim 1 wherein said sorbent is injected into said sulfur-containing gases as an aqueous solution or particulate suspension.

9. A process according to claim 1 wherein said sorbent is injected into said sulfur-containing gases as an aqueous solution.

10. A process according to claim 1 wherein said sorbent is injected into said sulfur-containing gases as a particulate suspension.

11. A process according to claim 1 further including the steps of reducing the temperature of said volume of gas to 150-350 degrees F temperature range and humidifying the mixture comprising alkali sulfite, alkali hydroxide and said gas to provide further reduction of $SO_2$ by means of the reaction of said alkali hydroxide with the remaining $SO_2$.

* * * * *